Aug. 24, 1943.  W. A. HALL  2,327,421
SCREEN DOOR INSECT TRAP
Filed March 22, 1943
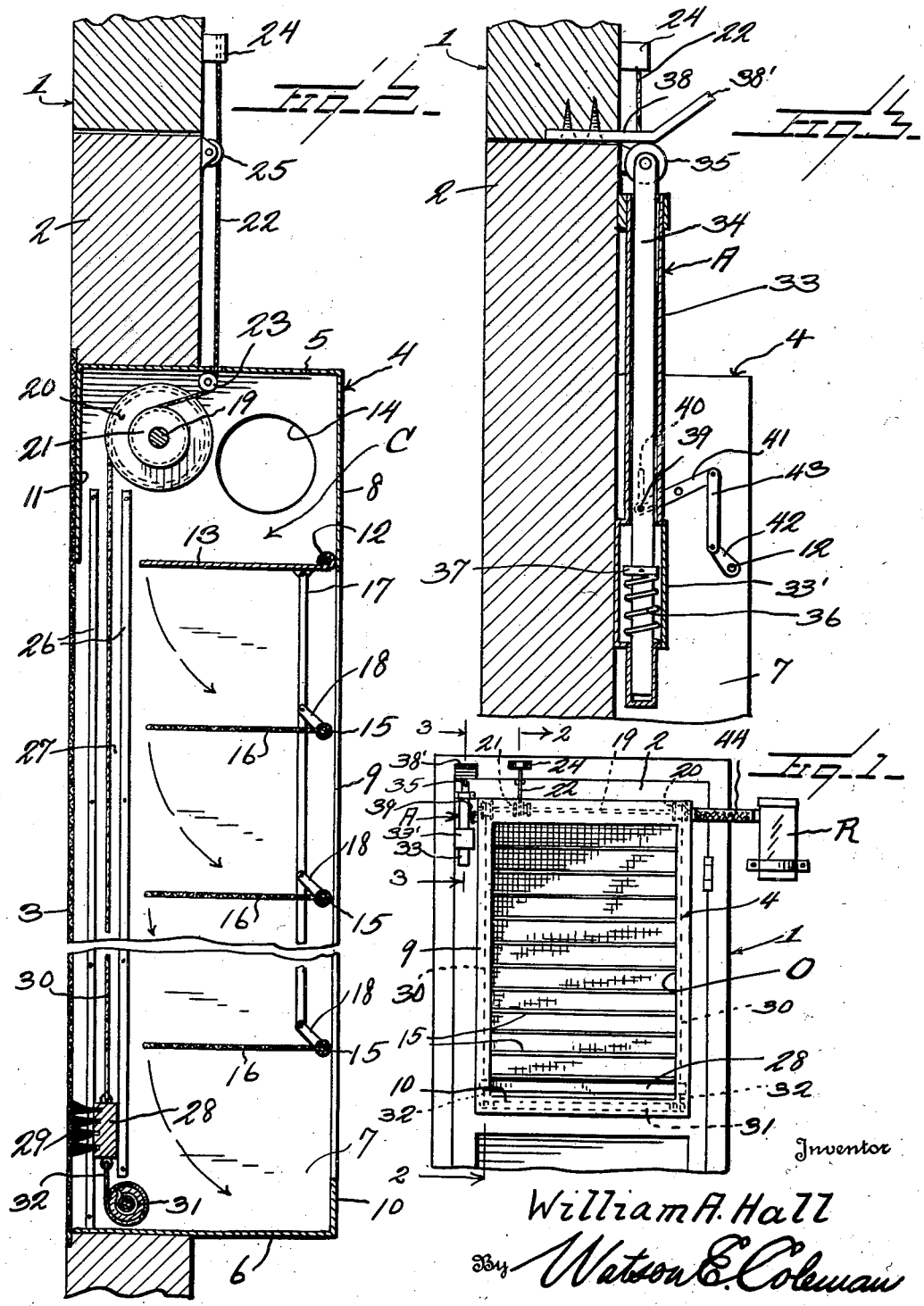
Inventor
William A. Hall
By Watson E. Coleman
Attorney Patented Aug. 24, 1943

2,327,421

UNITED STATES PATENT OFFICE 2,327,421

SCREEN DOOR INSECT TRAP

William A. Hall, San Acacio, Colo.

Application March 22, 1943, Serial No. 480,080

7 Claims. (Cl. 43—110)

This invention relates generally to the class of trapping and pertains particularly to improvements in insect traps.

A principal object of the present invention is to provide a novel insect trap which is designed to be applied to a standard screen door to trap flies and other insects which light on the outside of the screen and, as a usual thing, rise and fly over the top of the door in through the doorway when the screen door is opened, the trap being so designed that the insects will be forced to collect in a portion of the structure before the screen, when the door is opened, where they will be kept after the door is closed and from which pass into a permanent trap receptacle.

Another object of the invention is to provide an insect trap designed to be applied to a standard screen door in which means is employed, when the door is opened, to sweep the flies and other insects from the outer side of the screen upwardly into a receiving chamber in which they are trapped when the door is closed and from which they pass into a receptacle supported at the side of the door, in which they may be destroyed.

The invention will be best understood from a consideration of the following detailed description taken in connection with the accompanying drawing, it being understood, however, that the invention is not to be considered as limited by the specific illustration or description but that such illustration and description constitute a preferred embodiment of the invention.

In the drawing:

Fig. 1 is a view in elevation of the insect trapping device embodying the present invention, the same being shown mounted upon the outer side of a screen door.

Fig. 2 is a vertical section taken substantially on the line 2—2 of Fig. 1, the view being upon an enlarged scale.

Fig. 3 is a vertical section on an enlarged scale taken substantially on the line 3—3 of Fig. 1.

Referring now more particularly to the drawing the numeral 1 generally designates a door frame while the numeral 2 designates a screen door frame which is hingedly mounted in the usual manner in the outer part of the door frame 1.

As is well known screen doors usually have a large upper screen panel which is secured in the door frame upon the outer side thereof.

In carrying out the present invention this screen panel which is indicated by the numeral 3, is located upon the inner side of the door so that there may be set in the upper part of the frame which is covered by the screen panel 3, the rectangular trap housing which is indicated as a whole by the numeral 4. This trap housing is set in from the outer side of the screen door and projects to some extent forwardly therefrom.

The trap housing, as shown, comprises the top and bottom border walls 5 and 6 respectively and the side border walls 7, these border walls being secured in the frame in the manner illustrated. The screen panel 3 covers the inner side of the trap housing, as shown, while the outer or forward side has the downwardly extending short front wall 8 and the inwardly and upwardly extending side and bottom flanges 9 and 10 respectively.

At the inner side of the housing an imperforate inner wall 11 may be provided of the same height as the front wall 8, to cover a portion of the screen panel 3.

Extending across the housing along the bottom edge of the wall 8 is a rock shaft 12 which carries an imperforate trap door 13 having a length equal to the interior width of the housing and having a width to extend from the wall 8 rearwardly through the major portion of the depth of the housing, when the trap door is in the horizontal position, shown in Fig. 2. This door together with the top wall 5, the panel 11, front wall 8 and adjacent portions of the side walls 7 form a trapping chamber in the upper part of the housing which is generally designated by the character C and leading from this chamber through one side wall 7, the side wall nearest the hinged side of the door, is an insect outlet opening 14.

As will be readily apparent the major portion of the forward side of the trap housing is open so that flies and other insects will have easy access to the interior and may enter and alight upon the outer side of the screen panel 3 which forms the inner or back wall of the trap housing. There is thus formed a relatively large rectangular entrance opening which is generally designed by the character O.

Extending transversely of the entrance opening O in vertically spaced parallel relation are rock bars 15 each of which carries the screen panel 16 which is of a width substantially equalling the distance between the adjacent shafts 15. Also, as will be readily seen, the width of the trap door 13 is substantially equal to the distance between the shaft 12 and the next lower shaft 15. Thus it will be seen that when the door 13 and panels 16 are oscillated downwardly to hanging position they will co-operate to form a closure for the opening O.

Co-ordinated swinging of the panel-like units 13—16 is effected through the medium of vertical side bars or links 17, the upper ends of which are pivotally attached to the trap door panel 13 while intermediate their ends they are pivotally connected with the shaft 15 by the short crank arms 18.

Disposed transversely of the upper part of the trap housing in the chamber C is a pulley shaft 19 upon which is mounted adjacent each end a pulley 20 while intermediate its ends is mounted a smaller pulley 21.

The pulley 21 has wound thereon an elastic cord or belt 22 which passes around a guide pulley 23 through the top wall 5 of the housing and upwardly to a bracket 24 which is secured to the door frame above the screen door and to which the cord is attached. A second guide pulley, indicated by the numeral 25, may be mounted upon the top of the screen door frame for the elastic cord or belt 22 to pass over so as to reduce friction as the door is swung open by preventing the belt from dragging across the top edge of the door.

Upon the inner side of each of the side border walls 7 is placed a pair of spaced parallel guide strips 26 which form a trackway or guide channel 27. Extending transversely of the trap housing is a horizontal brush bar 28 which has its ends slidably engaged in the opposite channels 27, as shown. This bar 28 forms the back of a brush, the bristles of which are indicated by the numeral 29, and these have contact with the forward side of the screen panel 3 over which they move vertically in the manner hereinafter described. At each end of the bar 28 there is attached a cable or cord 30 which may be of relatively stiff or heavy elastic material and each of these cords passes upwardly and is attached to one of the pulleys 20.

Extending transversely in the lower part of the trap housing and supported between opposite bordering side walls 7 is a spring roller 31 of the type commonly employed for window shades. This spring roller 31 has connected thereto a pair of cords or belts 32 each of which has an end attached to the brush bar 28, as shown in Fig. 2. The spring of the roller 31 constantly tends to turn the roller in a direction to wind up the cords 32 thereon so as to maintain the brush in its lowermost position and when the brush is pulled upwardly by the winding of the cord 30 on the pulleys 20 the spring is placed under further tension so that when the shaft 19 is free to be reversely turned the spring of the spring roller will pull the brush down again to its former lowered position.

Adjacent the free vertical edge of the screen door is located an actuator unit for the panels 13—16, the same being indicated as a whole by the character A. This actuator unit comprises a vertically disposed tubular housing 33 which adjacent its lower portion is slightly enlarged as indicated at 33'. This tube is closed at its lower end and open at its upper end and it has disposed therein the vertically reciprocable rod 34, the upper end of which projects beyond the open top of the tube and carries a roller or other anti-friction means 35.

Within the enlarged portion 33' of the tube is a coil spring 36 which surrounds the rod 34 and bears at its lower end against the bottom portion of the tube enlargement while at its upper end it is secured to the rod in any suitable manner as by means of a collar 37 and this spring is normally under tension and tends to project the rod upwardly.

The roller carrying upper end of the rod 34 is disposed adjacent the top of the screen door frame and when the screen door is closed the rod is held in downwardly forced position by means of the trip bracket 38, the outer portion of the bracket being turned up, as indicated at 38'. When the screen door is swung to open position the roller 35 moves from beneath the bracket 38 and the spring 36 projects the rod 34 upwardly but when the door is closed the roller rides onto the upwardly turned end 38' of the bracket and is smoothly but rapidly shifted downwardly so that the rod is moved in the same manner against the tension of the spring 36.

The rod 34 carries a pin 39 which projects laterally through a vertical slot 40 formed in the wall of the tube 33. Adjacent the pin 39 there is pivotally mounted upon the adjacent wall 7 a rocker lever 41, one end of which is pivotally connected with the pin 39.

As shown in Fig. 3, the pin 39 of the rod 34 is disposed adjacent to but slightly above the rock shaft 12 and this shaft carries a crank 42 which is operatively coupled by means of a link 43 with the other end of the rocker lever 41. By means of this mechanism the trap door 13 and the adjacent panels 16 are rocked into horizontal position, as shown in Fig. 2, when the rod 34 is forced downwardly against the tension of the spring 36 but when the rod is removed from beneath the trip bracket 38 so that the tension spring 36 can force it upwardly, the mechanism will be actuated to rock the crank 42 and swing the panels 13—16 downardly into cooperative relation to close the opening O.

Mounted upon the wall adjacent the hinged side of the screen door is an insect receiving receptacle R which is of light transmitting material and connecting this receptacle with the insect outlet opening 14 is a flexible tube 44 of opaque material.

This receptacle R may be provided with any suitable type of removable container, not shown, into which the insects will pass from the tube 44 and which can be taken away so that the insects may be conveniently destroyed.

In the operation of the present trap mechanism it will be apparent that when the screen door is closed the panels 13—16 will be raised to horizontal position and flies and other insects may then freely advance to the outer side of the screen panel 3 upon which they will alight in the usual manner. The brush 29 is at its lowermost position and the rod 34 is held depressed by the trip bracket 38. If the screen door is now opened a pull will be applied to the cord 22 which will rotate the shaft 19 and will cause the brush to be drawn upwardly over the outer side of the screen panel thus sweeping off the insects and causing them to rise. However, before the brush has risen to any extent the rod 34 will be released and the spring 36 will act to rapidly close the panels 13—16 to prevent the insects passing out through the opening O. In accordance with the well known characteristic of flies and other insects the insects on the screen will rise in the housing into the upper part or chamber C. When the screen door is released and allowed to return to its closed position the brush will return to its lowermost position and the rod 34, when the roller 35 passes under and in contact with the trip bracket 38, will be rapidly depressed and will cause the panel 13—16 to swing back to horizontal position. The imperforate and opaque panel or trap door 13 will thus rise and close the lower part of the chamber C thus trapping the insects in this chamber and since the interior of the chamber will be relatively dark the natural tendency of the insects will be to move toward the outlet 14 through which light will enter from the trap receptacle R. It is well known that flies in particular, as well as other insects, will not pass downwardly through an opening but always tend to rise, therefore, they will naturally move toward the outlet 14 and pass through into the receptacle R. The receptacle may then be taken away and the insects destroyed in any satisfactory manner.

The cable, belt or cord 22 is, as previously stated, of relatively heavy elastic material. By this arrangement when the brush has risen to its topmost position further opening movement may be given to the screen door without damaging the structure since the cord will then yield to allow such additional movement. It is to be understood, however, that the cord will be of sufficient strength to impart the desired rotation to the shaft 19 so as to raise the brush against the tension of the spring roller 31 and the cord will only stretch after excessive strain is placed thereon as by the further opening of the screen door after the brush has risen to the upper limit of its movement.

What is claimed is:

1. The combination with a screen door, of means providing a chamber at the upper part of the screen, the chamber having a bottom opening and further having an outlet opening above the bottom, means disposed upon the outer side of the screen below the chamber for movement over the screen toward the open bottom of the chamber to compel insects to rise from the screen and enter the chamber through the open bottom, means for actuating said first means, and an insect receiver disposed at one side of the screen and having communication with said outlet opening to receive insects from the chamber.

2. In combination with a screen door having a screen panel, means forming a chamber at the upper part of the screen panel, said chamber having a bottom inlet opening and having a wall provided with an insect outlet opening disposed above the bottom opening, an element normally closing the major portion of the bottom opening and shiftable to an open position, means for effecting the shifting of said element to open position upon the opening of the door, means movable over the screen toward said chamber inlet opening for effecting upward movement of insects from the screen into the inlet opening, means for effecting the movement of the last mentioned means upon opening of the door, and a receiver having communication with said outlet opening.

3. An insect trapping mechanism of the character stated in claim 2 including means operating in co-operation with the said means for closing the bottom opening of the chamber for covering the side of the screen adjacent to the chamber during the movement over the screen of the stated means for causing the insects to move upwardly into the chamber.

4. In a screen door structure an insect trapping mechanism comprising a substantially rectangular housing disposed upon the outer side of the door and having forward and rear open sides, the rear open side of the housing being covered by the screen of the door, means forming a chamber across the top of the housing, a movable closure member forming a bottom wall for the chamber, said closure member being swingable downwardly into the open forward part of the housing to open the lower part of the chamber, a plurality of panels co-operating with said closure member and supported for oscillation therewith for effecting the complete closing of said forward opening, said panels and closure being horizontally disposed when the door is closed, means for effecting oscillation for the panels and closure through the stated co-operation relation upon the opening of the door, means for causing insects upon the outer side of the screen to move upwardly into the casing upon the opening of the door and after the downward swinging of the panels and closure, and means by which the insects may move out of the chamber.

5. A trapping mechanism as set forth in claim 4 in which the stated means for causing the insects to move from the screen into the chamber comprises a brush supported for vertical movement in the casing over the surface of the screen, and means connected with the brush for moving the same from a lowermost position to an uppermost position simultaneously with the opening of the screen door.

6. An insect trapping mechanism comprising a rectangular housing having a forward opening and open at its rear, said housing being designed to be mounted against a screen door screen to have the rear opening covered thereby, means forming a chamber in the upper part of the housing, said chamber including a movable bottom wall, a rock shaft extending across the lower part of the chamber and supporting said bottom wall, a plurality of shafts in vertically spaced parallel relation with the rock shaft and extending across the forward opening, a panel carried by each of the stated plurality of rock shafts, said bottom wall closure and said panels being swingable from a horizontal position to a vertical position in which they co-operate to close said forward opening, an outlet for said chamber, a linkage mechanism operatively coupling all of said shaft for simultaneous oscillation, a reciprocable element operatively coupled with the linkage mechanism for actuating the same, means connected with said reciprocable element for constantly urging movement of the same in a direction to effect through said linkage mechanism movement of said panels and closure into opening closing position, means for effecting movement of the reciprocable element in the opposite direction upon disposition of the supporting door in closed position, mechanism for effecting the upward movement of insects from the forward side of the screen into said chamber when said opening is closed, and an insect receiver having communication with the said outlet opening of the chamber.

7. A structure as set forth in claim 6 in which the stated means for effecting the upward movement of the insects comprises a brush supported within the housing for vertical movement over the forward face of the screen, means operatively coupled with the brush and adapted for connection with a fixed point with respect to the movable screen door for drawing the brush upwardly as the screen door is swung into open position, and means for returning the brush to its lowermost position in the housing when the screen door is moved to its closed position.

WILLIAM A. HALL.